United States Patent [19]

Rosenberg et al.

[11] Patent Number: 5,450,562
[45] Date of Patent: Sep. 12, 1995

[54] CACHE-BASED DATA COMPRESSION/DECOMPRESSION

[75] Inventors: Charles Rosenberg, Mt. View, Calif.; Thomas G. Berge, Boise, Id.

[73] Assignee: Hewlett-Packard Company, Palo Alto, Calif.

[21] Appl. No.: 963,201

[22] Filed: Oct. 19, 1992

[51] Int. Cl.⁶ .............................................. G06F 12/02
[52] U.S. Cl. ............................... 395/446; 364/DIG. 1; 364/229.1; 364/243.4; 341/55; 341/56; 341/99
[58] Field of Search .................. 364/200 MS, 900 MS; 395/400, 425; 341/26 MS, 29 MS, 56 MS, 55 MS, 99 MS

[56] References Cited

U.S. PATENT DOCUMENTS

| | | | |
|---|---|---|---|
| 4,369,463 | 1/1983 | Anastassiou et al. | 358/135 |
| 4,562,536 | 12/1985 | Keeley et al. | 395/575 |
| 4,626,824 | 12/1986 | Larson | 340/347 |
| 4,783,735 | 11/1988 | Miu et al. | 395/425 |
| 4,797,814 | 1/1989 | Brenza | 395/425 |
| 5,043,885 | 8/1991 | Robinson | 395/425 |
| 5,125,085 | 6/1992 | Phillips | 395/400 |
| 5,185,856 | 2/1993 | Alcorn et al. | 395/130 |
| 5,263,136 | 11/1993 | DeAyuiar et al. | 395/164 |

FOREIGN PATENT DOCUMENTS

0491498A2  6/1992  European Pat. Off. .
0491498A3  6/1992  European Pat. Off. .

OTHER PUBLICATIONS

Roy Hunter and A. Harry Robinson, "International Digital Facsimile Coding Standards", Proceedings of the IEEE, vol. 68, No. 7, Jul. 1980, pp. 854–371.

Ross N. Williams. "An Extremely fast ZIV–Lempel Data Compression Algorithm," Proceedings of the IEEE Data Compression Conf., Apr. 1991, pp. 362–371.

Thomas S. Huang. "Coding of Two-Tone Images", IEEE Transactions on Communications, vol. COM–25, No. 11, Nov. 1977, pp. 1406–1424.

J. C. Stoffel. "Halftone Pictorial Encoding", SPIE Applications of Digital Image Processing, vol. 19, 1977, pp. 56–63.

Glen G. Langdon, Jr. and Jorma Rissanen. "Compression of Black–White Images with Arithmetic Coding", IEEE Transactions on Communications, vol. COM–29, No. 6, Jun. 1981, pp. 858–867.

Jon Louis Bentley, Andiel D. Sleator, Robert E. Tarjan and Victor K. Wei. "A Locally Adaptive Data Compression Scheme", Communications of the ACM, vol.29, No. 4, Apr. 1986, pp. 320–330.

R. Nigel Horspool. "Technical Correspondence on A Locally Adaptive Data Compression Scheme", Communications of the ACM, vol. 30, No. 9, Sep. 1987, pp. 792–793.

(List continued on next page.)

Primary Examiner—Rebecca L. Rudolph
Assistant Examiner—Hiep T. Nguyen

[57] ABSTRACT

A system for compressing bilevel data includes a first cache memory having a plurality of assigned levels of usage, a first usage level assigned to a most recently used data segments and a second level assigned to a plurality of less recently used data segments. A processor determines if a received data segment is found in the cache memory and, if not, it assigns the received data segment to the cache memory's first level in place of a previous data segment stored therein. The previous data segment is assigned to a position in the second level in place of a less recently used data segment. The less recently used data segment that is displaced is chosen by a pseudo-random method. A not-found indication is then transmitted to a receiving station along with the identity of the received data segment. The receiving station contains identical cache structures and updates its caches in response to received code words and data segments. A further version of the invention emplaces data segments into cache memories in accordance with the context in which the data segments are found, the cache memories being assigned in accordance with context derived addresses.

22 Claims, 7 Drawing Sheets

OTHER PUBLICATIONS

T. Usubuchi, T. Omachi, and K. Ilnuma "Adaptive Predictive Coding for Newspaper Facsimile", Proceedings of the IEEE, vol. 68, No. 7, 1980, pp. 807–813.

Horst Hampel, et al. "Technical Features of the JBIG Standard for Progressive B-level Image Compression", Image Communication Journal vol. 4, No. 2 (1992).

Jon Louis Bentley, Andiel D. Sleator, Robert E. Tarjan and Victor K. Wei. "A Locally Adaptive Data Compression Scheme", Communications of the ACM, vol. 29, No. 4, Apr. 1986, pp. 320–330.

Takahiro Saito, Ryuji Abe, Takashi Komatsu, Hiroshi Harashima "Multi-Dimensional Lossy Coding via Copying With Its Practical Application to Interframe Low-Rate Video Compression", IEICE Transactions, vol. E–74, No. 9, Sep. 1991, pp. 2513–2521.

CACHE-BASED DATA COMPRESSION/DECOMPRESSION

FIELD OF THE INVENTION

This invention relates to methods and apparatus for data compression and decompression, and more particularly, to such methods and apparatus with synchronously operating cache memories.

BACKGROUND OF THE INVENTION

The goal of data compression is to reduce the number of bits required to represent data or an image. The prior art is replete with many methods for data compression. Those methods which provide the highest levels of data compression generally require the most complex data processing equipment and are often slow in execution. Those methods which offer lower levels of data compression often operate faster and employ less complex hardware. In general, the choice of a data compression method is made based upon a compromise between system complexity and time of execution versus desired level of data compression.

The published prior art contains a number of techniques of data compression methods. "Coding of Two-Tone Images", Hwang, IEEE Transactions on Communications, Vol. COM-25, No. 11, November, 1977, pp. 1406–1424, is a review paper that describes a number of techniques for efficient coding of both alphanumeric data and image data. Both single dimension (run length) and two-dimension coding (e.g. per block of pixel data) are considered. Hunter et al. in "International Digital Facsimile Coding Standards", Proceedings of the IEEE, Vol. 68, No. 7, July, 1980, pp. 854–867 describe various algorithms used in facsimile transmission (generally one-dimension coding techniques). They also describe two-dimension coding schemes wherein conditions of a subsequent coding line are encoded in dependence upon conditions in a previous reference line.

In a paper entitled "An Extremely Fast Ziv-Lempel Data Compression Algorithm" by Williams, Proceedings of the IEEE Data Compression Conference, April, 1991, pp. 362–371, a fast implementation of the Lempel-Ziv (LZ) compression algorithm is described that employs the well-known LZ method. That method constructs a dictionary of data strings at both the receiving and transmitting nodes and transmits codes in dependence upon matches found between an input data string and a data string found in the dictionary.

Usubuchi et al. in "Adaptive Predictive Coding For Newspaper Facsimile", Proceedings of the IEEE, Vol. 68, No. 1980, pp. 807–813, describe an adaptive, predictive algorithm which is applied to compression of half-tone image data. A further predictive method of encoding of half-tone picture images is described by Stoffel in "Half-tone Pictorial Encoding", SPIE Applications of Digital Image Processing, Vol. 19, 1977, pp. 56–63. Stoffel's algorithm divides an image into blocks and tries to predict the current block from the previous block. The final coded image consists of prediction errors and block values.

In "Compression of Black-White Images with Arithmetic Coding" by Langdon, Jr. et al., IEEE Transactions on Communications, Vol. COM-29, No. 6, June, 1981, pp. 858–867, there is described an arithmetic coding method wherein a pixel by pixel probability is estimated based upon the pixel's context (i.e., surrounding pixels). The arithmetic code of Langdon, Jr. et al. avoids multiplication operations inherent in some earlier arithmetic codes. The Langdon, Jr. et al. compression technique is soon to be an international standard for coding of bi-level image data as indicated by Hampel et al., "Technical Features of the JBIG Standard for Progressive Bi-Level Image Compression", Signal Processing: Image Communication Journal, Vol. 4, No. 2 (1992), pp. 103–111.

Bentley et al. in "A Locally Adaptive Data Compression Scheme", Communications of the ACM, Apr. 8, 1986, Vol. 29, No. 4, pp. 320–330 and "Technical Correspondence", Communications of the ACM, September 1987, Vol. 30, No. 9, pp. 792, 793 describe methods for compression of textual data using a self-organizing sequential search technique. In specific, frequently accessed words are near the top of a search sequence so they are encountered early in the compression action.

The system described by Bentley et al. is similar to a cache memory in a central processing unit memory system. Specifically, a cache memory with least recently used (LRU) management is employed (the cache taking the form of a list of numbers). The list is ordered in a most recently to least recently used fashion. Every time a value or word is encountered, it is removed from the cache list and placed at the top of the cache list, with the rest of the values being "moved down", If a word is encountered which is not in the cache list, then the least recently used value is removed from the cache to make room for the new value (at the top).

Figure 1:
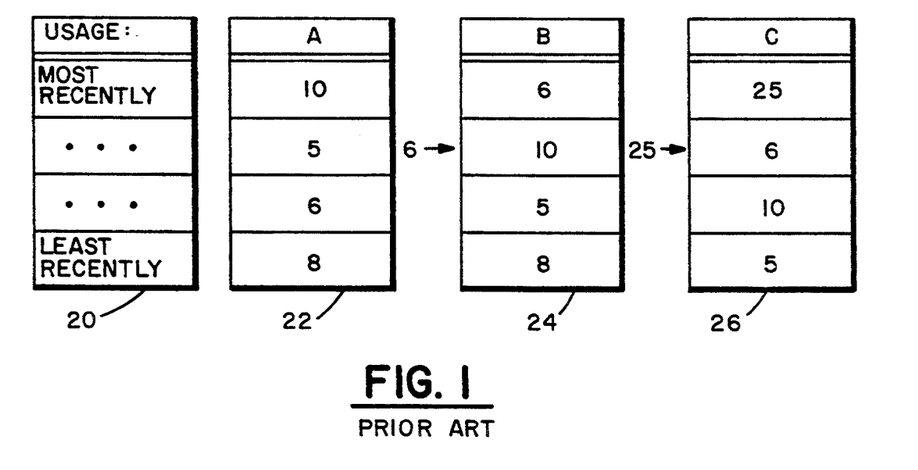
FIG. 1 illustrates prior art adaptation of a least recently used cache in a data encoding system.

The tables shown in FIG. 1, illustrate a sequence of actions in such a cache. Table 20 illustrates a four position cache wherein a most recently used value resides at the "top" of the cache and a least recently used value resides at the "bottom" of the cache, with other values residing in intermediate positions. Cache representations 22, 24 and 26 illustrate successive states of cache 20. Cache state 22 is the initial state of cache 20 and shows it storing four decimal values, with decimal value 10 being the most recently used value. Cache state 24 is the state of cache 20 after a value of 6 is encountered. Since the value 6 was already in cache 20, it is moved to the top of the cache and the values 10 and 5 are pushed down. Cache state 26 occurs after a value of 25 is encountered. Since that value is not in cache 20, the value is inserted at the top of cache 20 and the least recently used value (8) is removed and the other values pushed down.

Encoding and decoding processes employed for data compression and decompression manipulate compressed code words and cache adaptation so as to assure cache state synchronization in both encoder and decoder mechanisms. Cache synchronization assures lossless data handling. As shown in FIG. 1, the state of cache 20 is "adapted" as each new value is encountered. If a value is already in the cache of an encoder, then its cache position is transmitted in the form of a code word that indicates the position of the value. If the value is not in the cache, then a special code word is output by the encoder along with the value, per se. Compression is achieved because in general, the cache position can be transmitted with less bits than the value itself. The decoder interprets received code words and reconstructs the original data stream. The decoder further "adapts" its cache in the same way as the encoder, so as to remain synchronous therewith.

Figure 2:
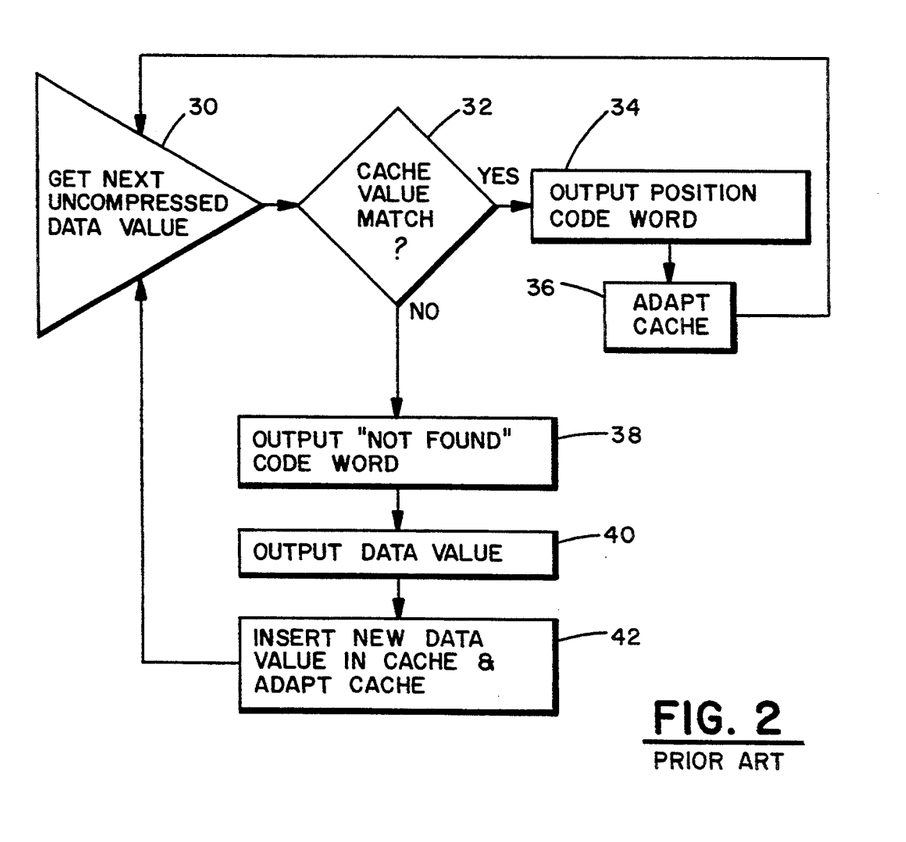
FIG. 2 is a flow diagram illustrating a prior art process for encoding of data segments through the use of a least recently used cache store.
Figure 3:
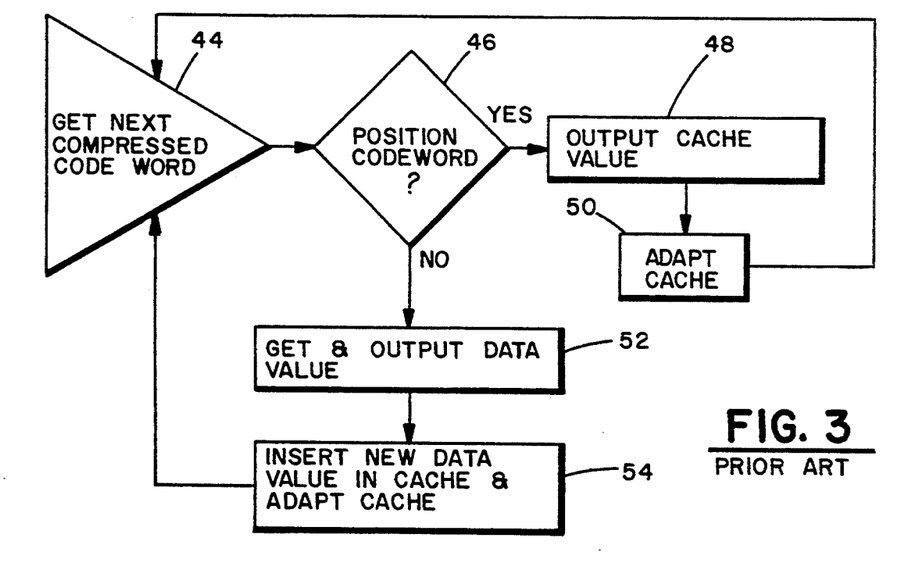
FIG. 3 is a flow diagram illustrating a prior art process for decoding of data segments through the use of a least recently used cache store.

The procedure employed to assure synchronism of caches in both encoder and decoder mechanisms is illustrated in FIGS. 2 and 3. FIG. 2 illustrates the encoding procedure and FIG. 3 illustrates the decoding procedure. Referring to FIG. 2, an uncompressed data value (e.g. a byte) is accessed (box 30), and it is then determined whether that uncompressed data value matches a value in the compression cache (decision box 32). If yes, the position code indicating the position of the matching value in the cache is outputted (box 34), and the cache is adapted (box 36) by moving, if necessary, the matching cache value up to the top of the cache and accordingly rearranging remaining values. The procedure then recycles to the next uncompressed data value.

If no cache match is found for a received data value, a "not found" code word is issued (box 38), and the actual data value is also outputted (box 40). The received data value is then inserted in the top of the cache and the remainder of the cache is "adapted" by pushing down the remaining values and eliminating the least recently used value.

Upon decompression (FIG. 3), a compressed code word is accessed (box 44) and it is determined whether it contains a position code word (decision box 46). If yes, the decoder cache value at that position is outputted (box 48) and the cache is adapted by moving the outputted cache value up to the top of the cache (box 50).

If, by contrast, the received data is not a position code word, the data value received is accessed and outputted (box 52) and it is also inserted into the cache, at the top, and the remainder of the cache is adapted.

While a cache-based compression procedure such as that described above is efficient, the management of a least recently used cache is often computationally complex. Each time the cache is "adapted", a large number of values need to be rearranged. Such rearrangement, as it occurs many times during a compression sequence, can occupy substantial processing time and renders the compression procedure considerably less efficient.

It is therefore an object of this invention to render a cache based compression procedure more efficient through the use of improved cache management techniques.

It is still another object of this invention to provide an improved compression/decompression procedure that employs cache-based prediction techniques.

It is yet another object of this invention to provide a cache-based compression/decompression procedure that is particularly adapted to image processing and makes use of data content in the vicinity of a value to be compressed.

SUMMARY OF THE INVENTION

A system for compressing bilevel data includes a first cache memory having a plurality of assigned levels of usage, a first usage level assigned to a most recently used data segments and a second level assigned to a plurality of less recently used data segments. A processor determines if a received data segment is found in the cache memory and, if not, it assigns the received data segment to the cache memory's first level in place of a previous data segment stored therein. The previous data segment is assigned to a position in the second level in place of a less recently used data segment. The less recently used data segment that is displaced is chosen by a pseudo-random method. A not-found indication is then transmitted to a receiving station along with the identity of the received data segment. The receiving station contains identical cache structures and updates its caches in response to received code words and data segments. A further version of the invention emplaces data segments into cache memories in accordance with the context in which the data segments are found, the cache memories being assigned in accordance with context derived addresses.

DETAILED DESCRIPTION OF THE INVENTION

Hereafter, the invention will be described in the context of a host processor communicating with a printer, with encoding being carried out on bytes (8 bits) of transmitted data. It is to be realized, however, that the procedure and system hereafter to be described apply to a variety of systems that communicate data and employ compression/decompression procedures for transmission bandwidth economies and memory savings.

Figure 4:
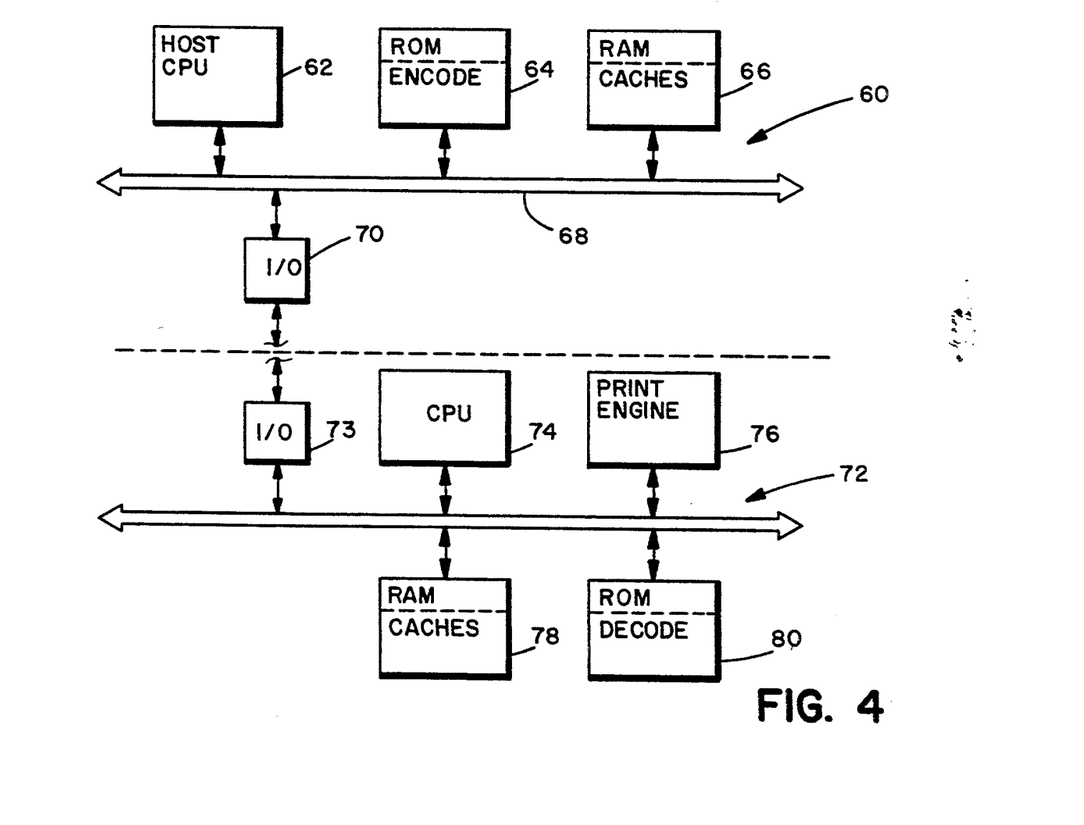
FIG. 4 is a block diagram of a system adapted to carry out the invention hereof.

In FIG. 4, a host processor 60 includes a host central processing unit (CPU) 62, a read only memory (ROM) 64 and a random access memory (RAM) 66. Each of the aforesaid modules is interconnected by a bus 68, with input/output communications being handled by I/O module 70. ROM 64 includes encoding procedures that perform data compression operations under control of host CPU 62, prior to transmitting data via I/O module 70 over a transmission line. RAM 66 contains a plurality of cache memories that are structured in a least recently used (LRU) fashion to enable data compression to be achieved.

Data transmitted from I/O module 70 is received in a printer 72 through I/O module 73. Printer 72 comprises a CPU 74, print engine 76, RAM 78 and ROM 80. RAM 78 serves as temporary storage for incoming data received through I/O module 73 and also includes cache memories that are identical in structure to the cache memories contained in RAM 66 in host processor 60. ROM 80 contains decode procedures that enable compressed data received via I/O module 73 to be decompressed and then stored for usage in RAM 78.

As above indicated, cache memories contained in RAMs 66 and 78 are structured as LRU caches, wherein data at the top of the cache is the most recently used and data at the bottom of the cache is the least recently used. Management of such a cache can be computationally complex because each time the cache is revised ("adapted"), a large number of values need to be rearranged.

Figure 5:
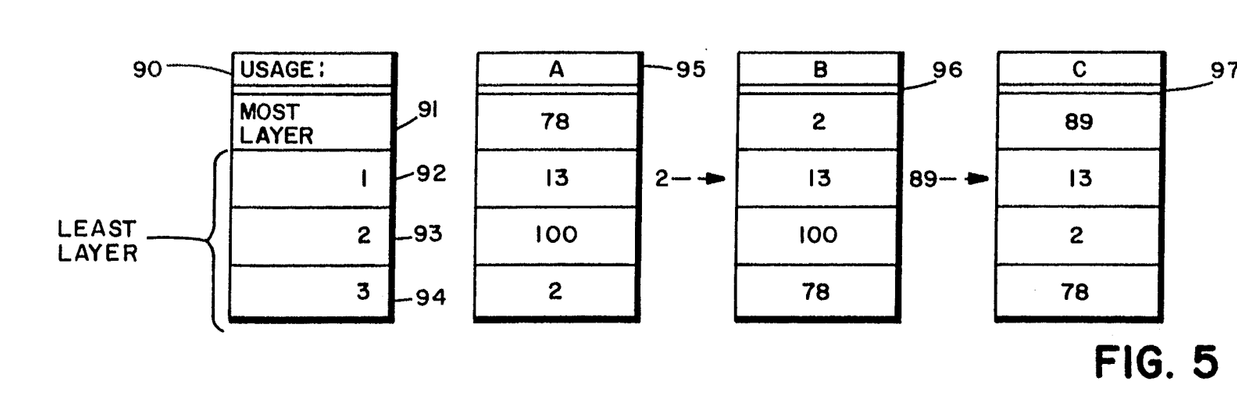
FIG. 5 is a schematic representation of cache states, illustrating a process for encoding data using a layered least recently used cache.

In FIG. 5, a modified form of a LRU cache is illustrated that reduces computational complexity. Cache 90 is organized as a layered, LRU cache wherein topmost layer 91 is the most recently used data byte and the layers 92–94 comprise a "single" layer that includes the three least recently used data bytes. It is to be understood that cache 90 is shown as only having four entries and two layers for ease of description purposes only. It is possible to have any number of layers and entries per layer.

Choosing which value to remove from a particular layer of cache 90 can be accomplished pseudo-randomly while still maintaining synchronism between the encoding and decoding mechanisms. For example, a round robin count approach can be utilized wherein bytes to be removed from the least recently used layer are selected upon the basis of a sequential count of entries 92–94. In this manner, a larger cache can be maintained with less processing overhead and still be almost effective as an LRU cache.

Cache state representations 95, 96 and 97 show the state of cache 90 at three different times, i.e., A, B and C. At time A, cache state 95 is as illustrated. At time B, it is assumed that a byte of value 2 is encountered and is placed in most recently used layer 91. Since a byte of value 2 was already in the second level of the cache, the value 78 in the first level swaps positions with it, thereby causing 78 to be placed in position 94 (as shown in cache state 96). At time C, it is assumed that a byte of value 89 is encountered. Since this value is not in the cache, it is inserted into most recently used layer 91 and a pseudorandomly derived position from the LRU layer (in this case position 93) is overwritten with the value that was displaced by the value 89 (i.e. value 2).

The next time a value in the LRU layer requires replacement, it will be position 94 that will be displaced and then position 92, position 93 etc. As a result, the layering of cache 90 enables less movement of cache values during adaptation. Structurally, the position to be replaced in the LRU layer may be determined by the position of a pointer that is updated, as the round robin count is incremented.

Additional performance gains may be achieved by employing context to select from among a number of independent caches in which to emplace a newly received byte. A printer is generally supplied with a bit map memory that comprises a raster image of pixels, each pixel represented by a binary bit value. Each raster scan row is divided into a series of 8 bit bytes. Surrounding pixels which are spatially positioned so as to have been previously decoded are used as the context for deciding which cache is to be used to store a most recently used byte. Bit values from surrounding pixels are combined to form a number, enabling a context value (or index) to be derived which specifies which cache should be used. This action improves data compression by allowing each cache to better adapt itself specifically for each context.

Figure 6:
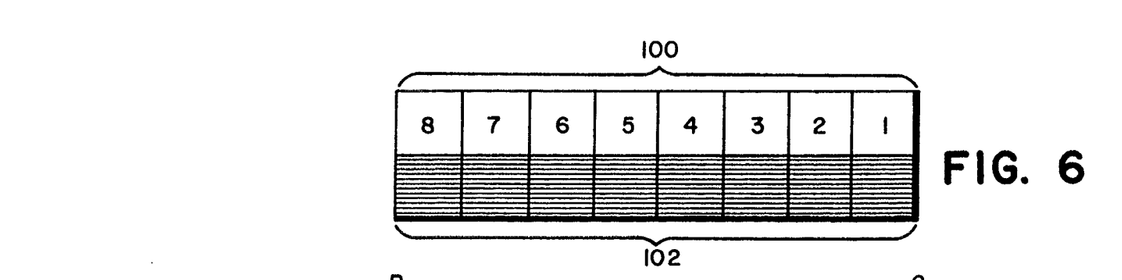
FIG. 6 is a diagram which illustrates a context data segment that is employed as an address of a specific one of a plurality of least recently used cache memories.

In the diagram shown in FIG. 6, the eight numbered pixels from a raster scan line (pixels 100) form the context value for the eight shaded pixels on the next raster scan to be coded (pixels 102). Hereafter, pixels 100 will be termed the context byte and pixels 102 will be termed the current byte. The philosophy of a context dependent cache arrangement is based upon the fact that images are often vertically related (e.g. vertical lines in a chart arrangement) and by employing a context byte as a cache address, it is likely that a current byte will encounter, in the most recently used entry in the addressed cache, an identical data byte—thereby enabling rapid encoding without further cache data movement. While a "vertical" context byte will form the basis of the ensuing description, it is to be understood that other physical relationships are within the scope of the invention.

In the implementation of a context dependent cache structure, all caches may be created and initialized at the start of a compression/decompression procedure. For instance, if an eight bit byte is to be employed, 256 caches may be created at the outset, each cache having a plurality of possible entries. If memory is more important than cache complexity, then not all of the caches need be created at the outset, and caches can be created only when needed.

Figure 7:
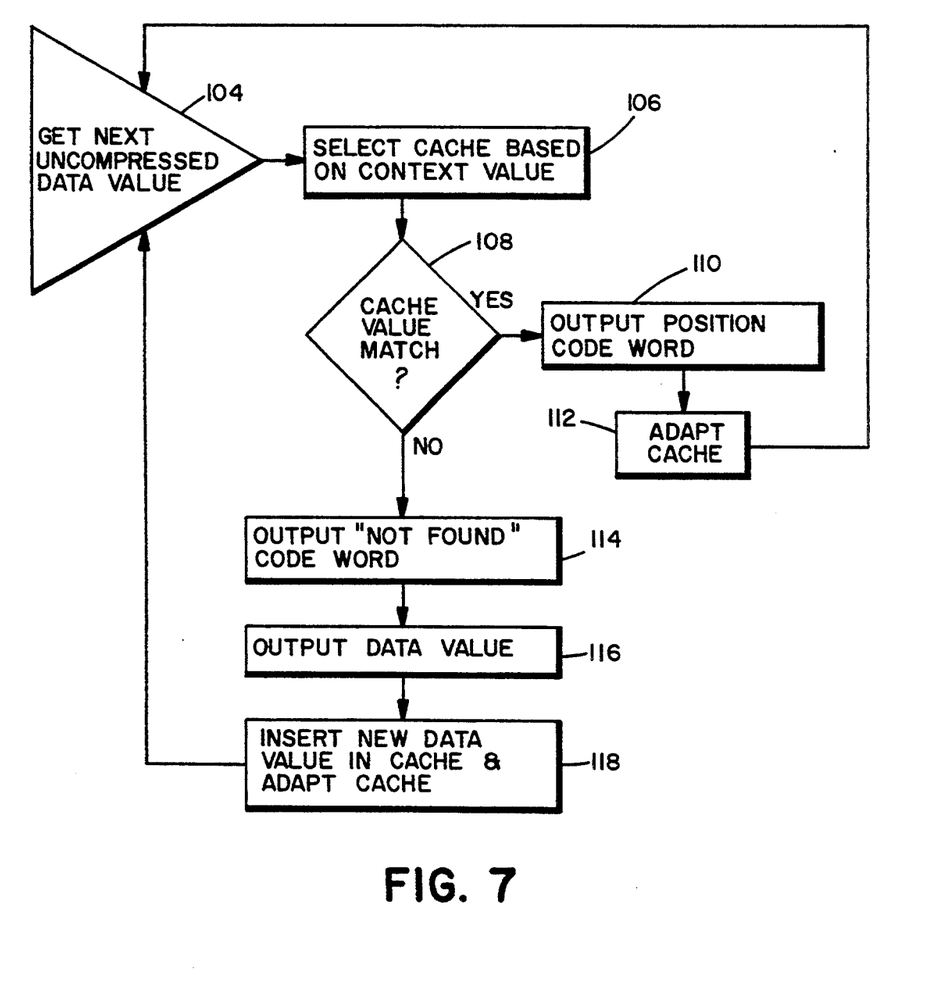
FIG. 7 is a flow diagram illustrating a compression encoding procedure for data segments, the procedure employing context dependent least recently used cache stores.

As shown in FIG. 7, once a new data byte is encountered that is to be transmitted (decision box 104), a specific cache is addressed having an address of the context byte which is vertically aligned on an immediately previous scan row of the pixel image (box 106). (As indicated above, it is likely that the most recently used entry in the addressed cache will be identical to the uncompressed byte value). The byte value is then matched with the values in the addressed cache (decision box 108) and if a match is found, a code word indicating the position of the matching value in the addressed cache is outputted (box 110). The cache is then adapted by moving, if necessary, the matching value up to the most recently used entry in the addressed cache (box 112) and the procedure recycles.

If no match is found in the addressed cache (decision box 108), a "not found" code word is outputted (box 114) and the actual byte value is transmitted (box 116). The non-matching byte value is inserted in the addressed cache and the cache is adapted (box 118) so as to move the displaced byte into a lower level of the cache and to displace a byte already in that lower level, etc. The procedure then recycles.

Figure 8:
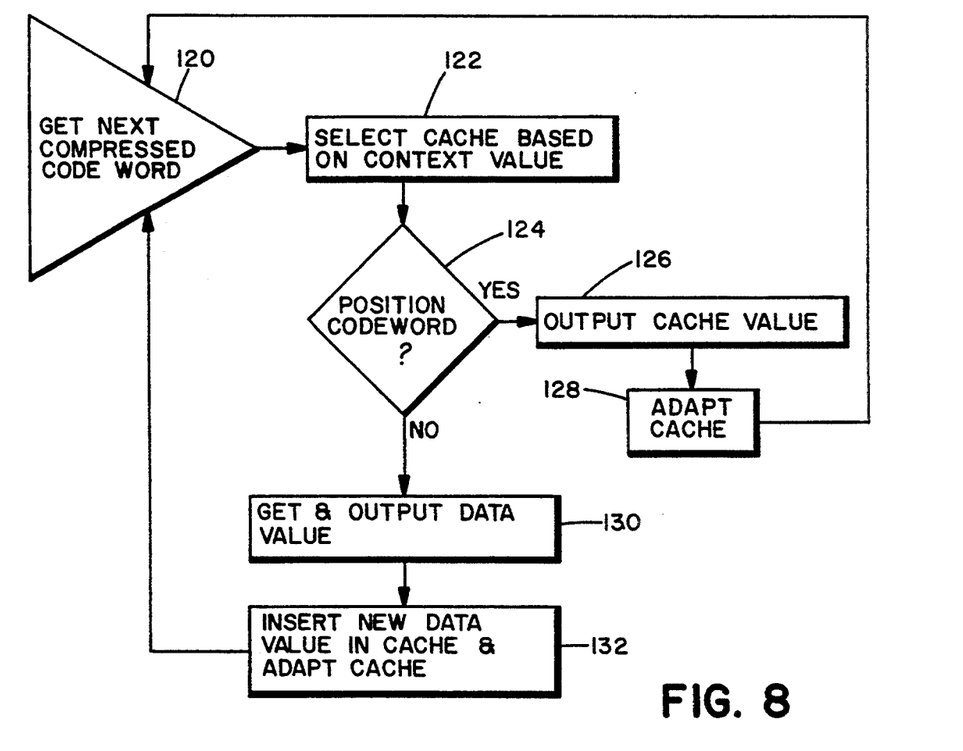
FIG. 8 illustrates a decompression procedure for decoding data that has been encoded in accordance with the flow diagram of FIG. 7.

In FIG. 8, a decompression procedure is shown that is responsive to data compressed by the procedure shown in FIG. 7. A received compressed code word is accessed (box 120) and a cache is addressed, based upon the context value of the already decoded context byte in the scan row immediately above (box 122). If the compressed code word is a position code word (decision box 124), the value appearing at the indicated position in the addressed cache is outputted (box 126) and the cache is then adapted, if necessary by rearranging the entries therein to enable the most recently used byte to be placed at the top of the cache (box 128).

If it is determined that the received data is not a position code word (decision box 124), a received byte value is accessed from memory (box 130) and is outputted. That new byte value is then inserted into the top of the addressed cache and the cache is adapted (box 132). The procedure recycles until no further received data is available.

In summary, a current row byte will always be directed to a cache whose address is the value of the context byte immediately above the current byte. The current byte becomes a context byte when the next scan row is accessed. If the context byte value is already an address of a cache, a new cache does not need to be created. If the context byte value is new, a new cache is established with the context byte as its address. If all caches were established at initialization, no new caches are required, as one cache for each possible context byte value already exists.

Figure 6A:
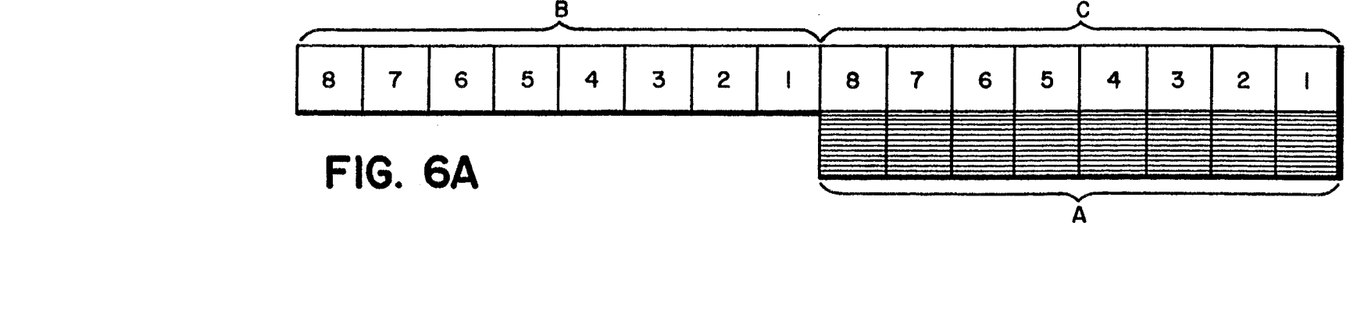
FIG. 6a is a diagram of an alternative arrangement of context data segments.

In the above discussion, the notion of a concept value was introduced. In that discussion the context value consisted of the value of the data segment from the raster scan line immediately above the current line. That context value was used as the cache address. The context value can also be formed from a combination of previously decoded data segments. The advantage is that more context can sometimes provide a better means of selecting the best performing cache to code the current data segment. One specific implementation of this concept uses not only the data segment directly above the current data segment but a piece of the data segment immediately above and to the left of the current data segment, as shown in FIG. 6a. One way to combine these two data segments into a context value is to append two bits from the data segment above and to the left to the data segment above. In FIG. 6a the byte labeled "A" is the current data segment. The bytes labeled "B" and "C" are the data segments which are used to form the context value. The context value can be generated by concatenating bits 1 and 2 of data segment B to bits 1 through 8 of data segment C, thereby generating a 10 bit data context value.

In some systems, it is desirable to reduce the complexity of decoding/decompression procedures at the expense of providing a more complex encoding procedure. Indirect cache management enables a portion of the decoding procedure to be transferred to the encoding procedure. This transfer is made possible due to the fact that in the case of an LRU cache, so long as a newly received data byte is found already stored in the cache, values in the cache do not change but are just rearranged. The only time a set of values in an LRU cache changes is when no match is found between a new data byte and bytes already stored in the cache. In indirect cache management, an encoder of added complexity is employed so that the decoder does not have to perform the value rearrangements necessary to maintain an LRU cache.

Figure 9:
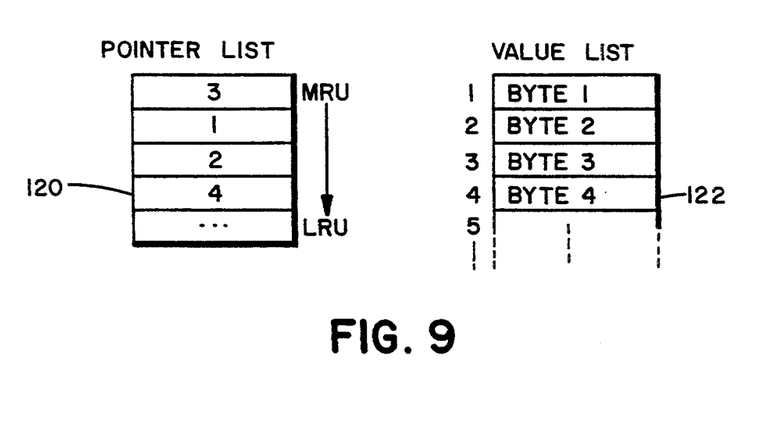
FIG. 9 illustrates two cache stores that are used to provide indirect least recently used cache management.

Referring to FIG. 9, a pair of cache memories 120 and 122 are shown that enable an encoding procedure to maintain two lists of numbers i.e., a pointer list in cache 120 and a byte value list in cache 122. The pointer list comprises pointers or indices to entries in the value list. When a match is found between a newly received byte and a byte already stored in the byte value list in cache 122, pointers in the pointer list in cache 120 are rearranged in an LRU manner. The values in the value list do not require rearrangement because no new value has entered the cache and no old value has been removed. Upon finding a match (between a new byte and a byte already stored in cache 122), the encoder emits the corresponding pointer value (i.e., indicates the value entry in cache 122 that corresponds to the received byte).

If a match is not found in cache 122, the value list and pointer list must be modified. The least recently used value in the value list in cache 122 is removed. This is accomplished by placing the current byte value in the value list position in cache 122 pointed to by the least recently used pointer in cache 120. Then, the pointers in cache 120 are updated to reflect the new order of values in cache 122. The newly entered current value is pointed to by the most recently used position in cache 120. In this case, the encoder emits a special code word signalling that no match was found, followed by the actual byte value and the pointer to the value list where it is to be inserted (in the decoder).

As is shown in FIG. 9, pointer list entries in cache 120 are arranged in a most recently to least recently used sequence. Thus, irrespective of the position of the byte value in the value list in cache 122, it is known from the position of a pointer in the pointer list what the most recently used byte value is in the value list and all succeeding usage levels for remaining stored byte values.

In the decoder, only a value list is maintained, not a pointer list. When a code word (e.g. a pointer value) is decoded, the value from the pointed-to position in the value list is outputted. If a "not found" code word is received, a pointer and the value are derived from the input stream and the value is placed in the value list in the decoder at the pointed-to position.

Figure 10:
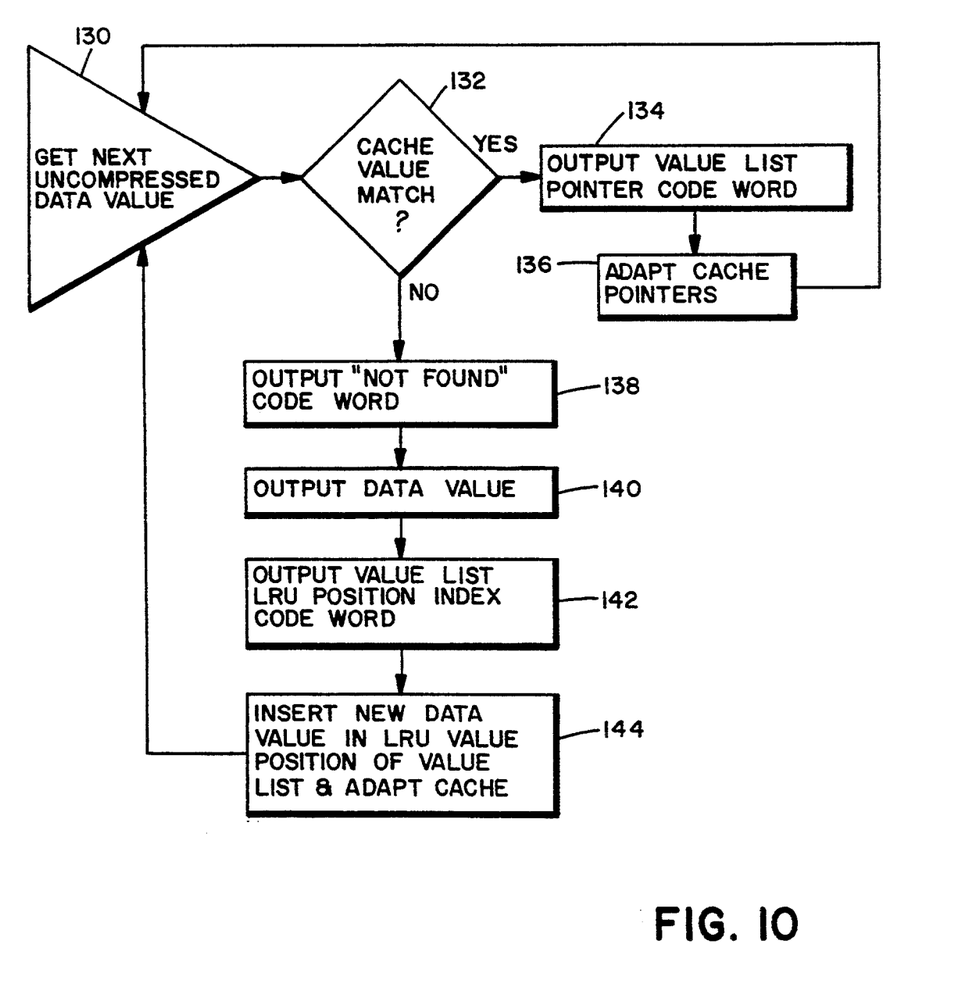
FIG. 10 is a flow diagram illustrating the compression procedure for indirect cache management in accordance with the cache stores shown in FIG. 9.

Referring to FIG. 10, the procedure for indirect cache management encoding (compression) will be described. When a new data value is encountered (box 130), it is determined whether that value matches a value already stored in cache 122 containing the value list (box 132). If yes, a pointer value is outputted from the pointer list that identifies where in the value list the matching value resides (box 134). Next, the pointers in the pointer list are adapted so as to properly indicate the most recently used byte value in the value list.

If no cache value match is found (decision box 132), a "not found" code word is outputted (box 138) accompanied by the not found data value (box 140). In addition, a pointer value is outputted that points to the least recently used value in the value list. The new data value is then inserted in the least recently used value position in the value list and the value previously stored therein is removed. The procedure then recycles to obtain the next uncompressed data value.

Figure 11:
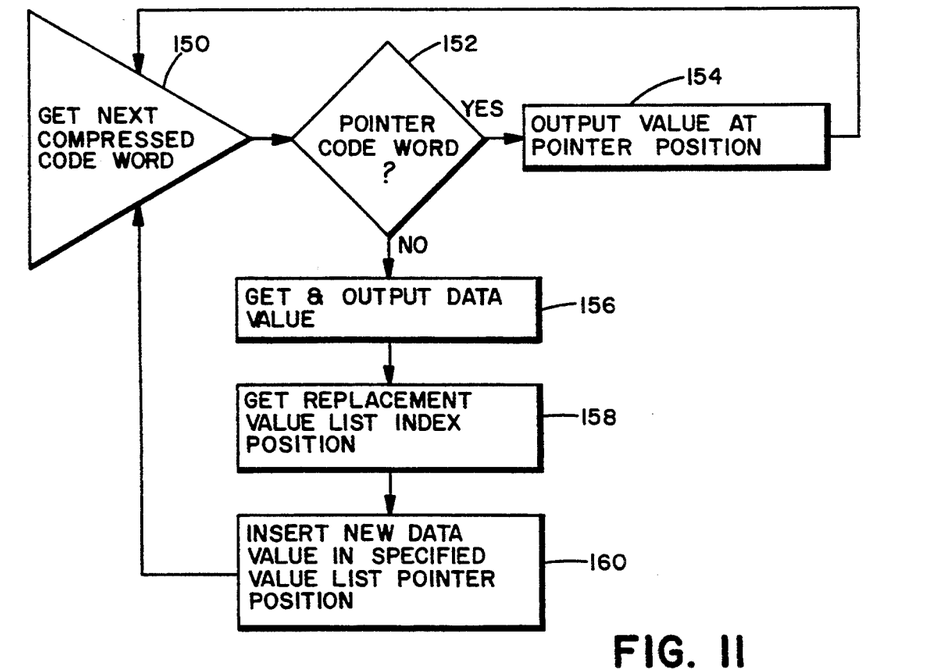
FIG. 11 is a flow diagram illustrating a decompression procedure for decoding data segments encoded in accordance with the flow diagram of FIG. 10.

In FIG. 11, the decoding (decompression) procedure is shown and commences by accessing a next compressed code word (box 150). If the code word is found to be a pointer, the "pointed to" value in the corresponding value list is outputted (decision box 152, box 154). If the code word is found not to be a pointer value (decision box 152), the received data value is accessed (box 156) along with the replacement pointer value (box 158). The new data value is then inserted in the pointed-to position in the value list. The value already there is discarded (box 160). The procedure recycles until there are no further compressed code words to process. It should be understood that indirect cache management and layered cache management may be employed in combination in order to gain benefits inherent in both techniques.

The system as described above has been indicated as encoding data in 8 bit bytes. If the data exhibits a different periodicity, i.e. 6 bits, 10 bits, etc., as in some dithered image data, the data can be broken up into units of bit length which match the image data periodicity.

Figure 12:
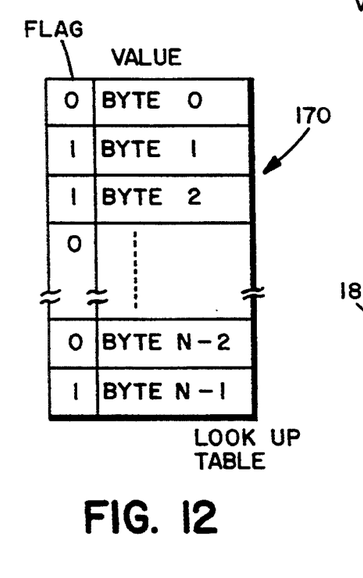
FIG. 12 illustrates a look-up table that indicates whether a byte volume is stored in cache.

An aspect of the above algorithms is that in order to determine if a value is in a cache, the value must be compared against every stored value in the cache. This comparison procedure may be avoided by maintaining a look-up table which contains a flag as to whether or not a particular value is in the cache (see table 170 in FIG. 12). Lookup table 170 must contain every possible value. The procedure still requires that if the value is present in the cache that its position must be determined in the cache.

Figure 13:
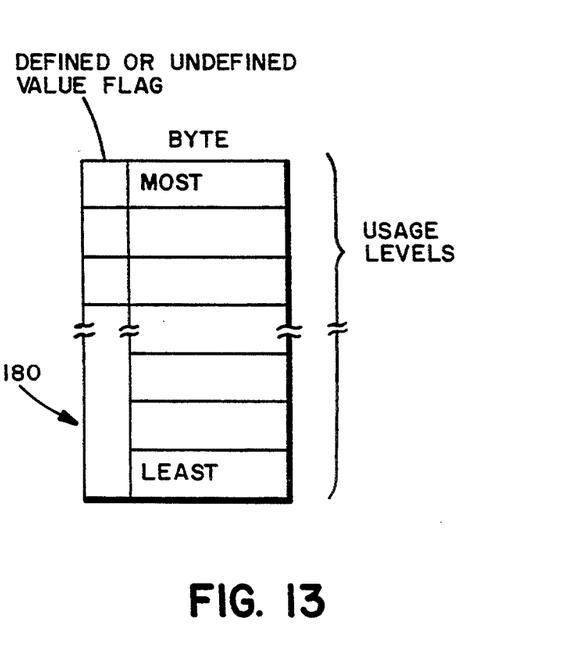
FIG. 13 illustrates an encoder cache arrangement having a flag associated with each storage position that indicates a defined or undefined status for the storage position.

As stated above, caches in both an encoder and decoder must be in the same initial state to ensure that they are synchronized during compression and decompression actions. This initialization can be eliminated in the decoder at the expense of some added complexity in the encoder. The encoder can associate a flag with every cache entry (such as shown in cache 180 in FIG. 13). This flag will indicate whether or not that cache entry has an undefined or defined value. A defined value is one wherein the cache entry represents an actual data byte value from the image being processed. The encoder can make sure never to match a value with an entry which has an undefined cache value. The decoder need not maintain those flags as it will never use an un-initialized value, since it will never be instructed to do so by the encoder.

The following example illustrates the operation of the invention with a two layered cache. The first layer has one assigned value and the second layer has three values. Code words (bit sequences are assigned as follows:

1 = first layer prediction correct
000 = second layer prediction #1 correct
001 = second layer prediction #2 correct
010 = second layer prediction #3 correct
011 = correction value is needed The cache starts out in the following condition:

| 1st layer | 2nd layer — #1 | 2nd layer — #2 | 2nd layer — #3 |
|---|---|---|---|
| 0 | 255 | 255 | 255 |

Random replacement in the second level of the cache is performed via a simple round robin approach. A variable "repl_index" is defined and initially set to 1. It determines which of the 2nd level cache entries will be replaced when a replacement is required. After a replacement is performed, "repl_index" is incremented. If "repl_index" reaches a value of four, it is reset to one.

The data stream to be coded consists of a sequence of bytes.

The following table traces the coding sequence. The cache state is shown after the current input value is processed.

| Input Value | Cache State | | | | Output Description and Action |
|---|---|---|---|---|---|
| | 1st layer | 2nd layer — #1 | 2nd layer — #2 | 2nd layer — #3 | |
| 100 | 100 | 0 | 0 | 0 | "011" & "01100100" is output; the cache is adapted; repl_num = repl_num + 1 (now = 2) |
| 17 | 17 | 0 | 100 | 0 | "011" & "00010001" is output; the cache is adapted; repl_num = repl_num + 1 (now = 3) |
| 100 | 100 | 0 | 17 | 0 | "001" is output; the cache is adapted |
| 100 | 100 | 0 | 17 | 0 | "1" is output |
| 9 | 9 | 0 | 17 | 100 | "011" & "00001001" is output; the cache is adapted; repl_num = repl_num + 1 (now = 4); repl_num = 1 |

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A system for data compression/decompression, including transmission means and receiving means, said transmission means comprising:

first cache memory means having a plurality of levels, a first said level assigned to a most recently used data segment, a second said level assigned to a plurality of less recently used data segments;

means for determining if a first data segment is found in said first cache memory means and, if not, assigning said first data segment to said first level in said first cache memory means in place of a second data segment assigned to said first level, and assigning said second data segment to a position in said second level in place of a less recently used data segment, said less recently used data segment chosen without regard to prior usage by a predetermined selection method from among less recently used data segments assigned to said second level;

means for transmitting to said receiving means a not found indication and said first data segment in uncompressed form; and means responsive to a determination that said first data segment is found in said first cache memory means for causing said transmitting means to transmit to said receiving means a position code indicating where in said first cache memory means said first data segment is assigned, said position code manifesting a smaller data size than said data segment.

2. The system as recited in claim 1, said receiving means including means for decompressing compressed form data that comprises:

second cache memory means having a plurality of levels, a first said level assigned to a most recently used data segment, a second said level assigned to a plurality of less recently used data segments;

means for maintaining data segments in said second cache memory means in synchronism with data segments in said first cache memory means; and means responsive to a position code received from said means for transmitting for accessing a data segment data position in said second cache memory means that corresponds to said received position code.

3. The system as recited in claim 2, wherein said first cache memory means comprises more than two assigned levels.

4. The system as recited in claim 3, wherein said predetermined method sequences a count through data segments assigned to a level having a plurality of less recently used data segments by a round robin count thereof, a data segment to be replaced being determined by a value of said count.

5. The system as recited in claim 1 wherein said means for determining includes a look-up table including a position for each possible value of a data segment and an associated flag to indicate whether the associated data segment value is present in said first cache memory means.

6. A method for compressing a raster scan representation of binary data through a use of multiple cache stores, each cache store for storing a plurality of data segments from said raster scan representation in a hierarchy of usage, said method comprising the steps of:

a. assigning a cache context identifier to each of a plurality of first cache stores, each cache context identifier having a value derived from a context data segment in one scan row of said raster scan representation;

b. accessing current data segments contained in a next scan row after said one scan row, each current data segment in said next scan row positionally aligned with a context data segment in said one scan row;

c. comparing each of said current data segments with data segments contained in a first cache store having an assigned cache context identifier equal in value to a positionally aligned context data segment to determine if a data segment contained in said first cache store matches a current data segment;

d. transmitting to a receiver a position identifier of a data segment within a first cache store if said current data segment is found to match said data segment within said first cache store, or a not found indicator and said current data segment if said current data segment is not found in said first cache store; and e. causing current data segments contained in said next scan row to become context data segments for a succeeding scan row of data segments; and f. assigning to a newly established first cache store, a new cache context identifier if no other first cache store has that cache context identifier assigned and repeating steps (b–f) until no further scan rows remain to be processed.

7. The method as recited in claim 6 further comprising the decompression steps of:

(g) establishing a plurality of second cache stores, each second cache store having an assigned cache context identifier related in value to a data segment value in a first scan row of said raster scan representation; and (h) decompressing a received position identifier by selecting a second cache store based upon a cache context identifier in a decompressed preceding scan row, and determining from contents of said selected second cache store at a position therein indicated by said received position identifier, an identity of a data segment assigned to said position.

8. The method as recited in claim 7 wherein each said first cache store and second cache store comprises a plurality of storage positions, arranged to store data segments in a most recently used to least recently used order, each storage position having an associated flag value indicating whether the position has a defined value data segment or an undefined value data segment stored therein, said comparing step (c) ignoring any storage position having a flag value indicating an undefined value data segment.

9. A method for compressing a stream of data segments through a use of multiple cache stores, each cache store for storing a plurality of data segments from said stream in a hierarchy of usage, said method comprising the steps of:

a. assigning a cache context identifier to each of a plurality of cache stores, each cache context identifier derived from a context data segment encountered in said data stream and having a potential correspondence with a later-to-be encountered current data segment;

b. accessing a current data segment having a predetermined temporal relationship with a context data segment;

c. comparing said current data segment with data segments contained in a cache store having an assigned cache context identifier equal in value to the context data segment, but if no cache store exists with a said assigned cache context identifier, establishing a new cache store with said cache context identifier;

d. transmitting to a receiver, a storage position identifier of said current data segment within a cache store if said current data segment is found in a said cache store, or a not found indicator and said current data segment if said current data segment is not found in said cache store, said storage position identifier manifesting a smaller data size than said data segment;

e. causing the current data segment to become a new context data segment for a succeeding current data segment; and f. assigning to a new cache store, said new context data segment if no other cache store has that context data segment value assigned and repeating steps (b–f) until no further data segments remain to be processed.

10. The method as recited in claim 9 further comprising the decompression steps of:

g. establishing at said receiver a plurality of cache stores, each cache store having an assigned cache context identifier corresponding to a data segment value previously encountered in said data stream; and h. decompressing a received storage position identifier by selecting a cache store based upon a cache context identifier value assigned to said cache store, and finding in said selected cache store at a position therein indicated by said storage position identifier, a data segment assigned to said position.

11. The method as recited in claim 9 wherein each of said cache stores comprises a plurality of storage positions, arranged to store data segments in a most recently used to least recently used order, each storage position having an associated flag value indicating whether the position has a defined value data segment or an undefined value data segment stored therein, said comparing step (c) ignoring any storage position having a flag value indicating an undefined value data segment.

12. In a system for compressing a raster scan representation of bilevel data through a use of multiple cache stores, each cache store for storing a plurality of data segments from said raster scan representation in a hierarchy of usage, a method comprising the steps of:
   a. assigning a cache context identifier to each of a plurality of cache stores, said plurality equal in number to possible values of said data segments, each cache context identifier equal in value to a possible value of a data segment;
   b. accessing current data segments contained in a scan row that succeeds a first scan row, each current data segment spatially aligned with a context data segment in said first scan row of said raster scan representation;
   c. comparing each of said current data segments with data segments contained in a cache store having an assigned cache identifier equal in value to a spatially aligned context data segment;
   d. transmitting to a receiver a position identifier of a data segment found in a said cache store, or a not found indicator and a current data segment, if said current data segment is not found in said cache store;
   e. causing current data segments contained in said scan row that succeeds said first scan row to become context data segments for a succeeding scan row of data segments; and
   f. repeating steps (b-f) until no further scan rows remain to be processed.

13. The method as recited in claim 12 further comprising the decompression steps of:
   g. establishing at said receiver a plurality of cache stores, each cache store having an assigned context identifier equal to a possible value of a data segment; and
   h. decompressing a received position identifier by selecting a cache store based upon a context identifier value in a decompressed preceding scan row, and determining from contents of said selected cache store, an identity of a data segment assigned to a position indicated by said position identifiers.

14. The method as recited in claim 12 wherein said system includes a look up table including positions for each possible value of a data segment and an associated flag to indicate whether the associated data segment value is present in a cache store, said comparing step (c) initially examining said look up table to determine if a data segment value is contained in said cache store.

15. The method as recited in claim 12, wherein each of said cache stores comprises a plurality of storage positions arranged to store data segments in a most recently used to least recently used order, each storage position having an associated flag value indicating whether the position has a defined value data segment or an undefined value data segment stored therein, said comparing step (c) ignoring any storage position having a flag value indicating an undefined value data segment.

16. In a system for compressing a stream of data segments through a use of multiple cache stores, each cache store for storing a plurality of data segments from said stream in a hierarchy of usage, a method comprising the steps of:
   a. assigning a cache context identifier to each of a plurality of cache stores, said plurality equal in number to possible values of said data segments, each cache context identifier identifying a context data segment;
   b. accessing a current data segment having a predetermined temporal relationship with at least one said context data segment;
   c. comparing said current data segment with data segments contained in a cache store having an assigned cache identifier that identifies the context data segment;
   d. transmitting to a receiver a position identifier of a data segment found in a said cache store, or a not found indicator and said current data segment if said current data segment is not found in said cache store;
   e. causing the current data segment to become a new context data segment for a succeeding current data segment; and
   f. repeating steps (b-f) until no further data segments remain to be processed.

17. The method as recited in claim 16 further comprising the decompression steps of:
   g. establishing at said receiver a plurality of cache stores, each cache store having an assigned context identifier value equal to a possible value of a data segment; and
   h. decompressing a received position identifier by selecting a cache store based upon a context identifier value and determining from contents of said selected cache store, an identity of a data segment assigned to a position indicated by said position identifiers.

18. The method as recited in claim 16 wherein said system includes a look up table including positions for each possible value of a data segment and an associated flag to indicate whether the associated data segment value is present in a cache store, said comparing step (c) initially examining said look up table to determine if a data segment value is contained in said cache store.

19. The method as recited in claim 16, wherein each said cache store comprises a plurality of storage positions arranged to store data segments in a most recently used to least recently used order, each storage position having an associated flag value indicating whether the position has a defined value data segment or an undefined value data segment stored therein, said comparing step (c) ignoring any storage position having a flag value indicating an undefined value data segment.

20. A system for data compression/decompression, comprising:
   first cache memory means for storing a plurality of data segments in a plurality of memory positions, each position having a position identifier;
   second cache memory means having a plurality of levels, a first level storing a position identifier for a most recently used data segment, said position identifier identifying where in said first cache memory means is stored said most recently used data segment and remaining levels storing position identifiers that identify storage positions in said first cache memory means wherein are stored less recently used data segments; and means for determining if a current data segment is found in said first cache memory means and if found, transmitting to receiving means said position identifier from said second cache memory means that indicates the position in said first cache memory means that stores said received data segment, and if not found, causing said current data segment to replace said most recently used data segment which, in turn, is caused to displace a less recently used data segment that is chosen without regard to prior usage.

21. The system as recited in claim 20 wherein, if said determining means does not find said current data segment in said first cache memory means, a not found indication, a pointer value indicating a position in said first cache memory means storing a least recently used data segment and said current data segment are transmitted to said receiving means.

22. The system as recited in claim 21, wherein said receiving means comprises:
  receiving cache memory means for storing a plurality of data segments in synchronism with data segments stored in said first cache memory means; and
  means responsive to a received position identifier for accessing a corresponding position in said receiving cache memory means and a data segment stored therein.

* * * * *